May 4, 1965     I. B. POLEVITZKY     3,181,987
METHODS AND SYSTEMS FOR REPRODUCING COLOR PATTERNS
IN MANUFACTURED ARTICLES, PARTICULARLY MOSAIC TILE
Filed May 8, 1961     10 Sheets-Sheet 5

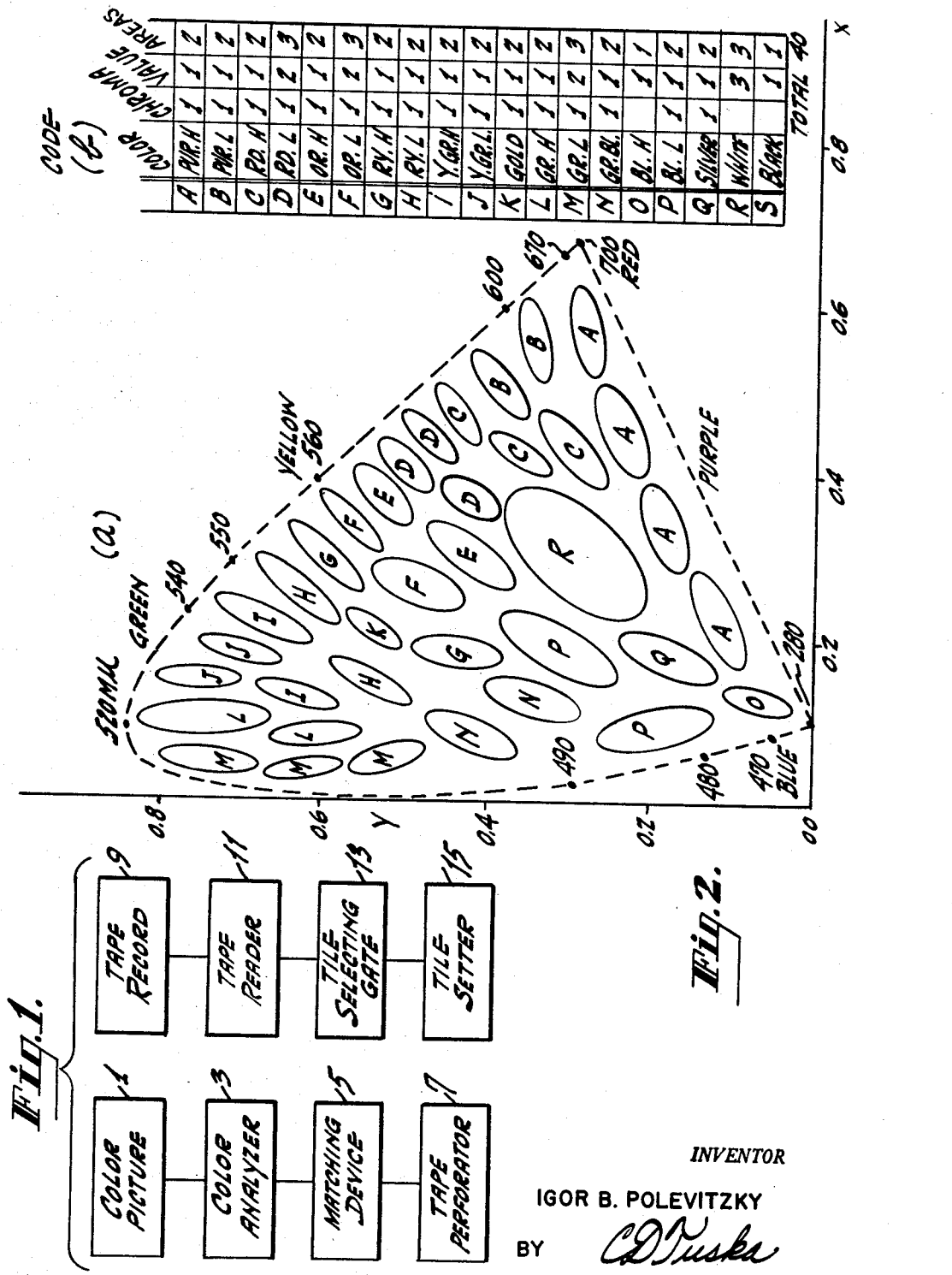

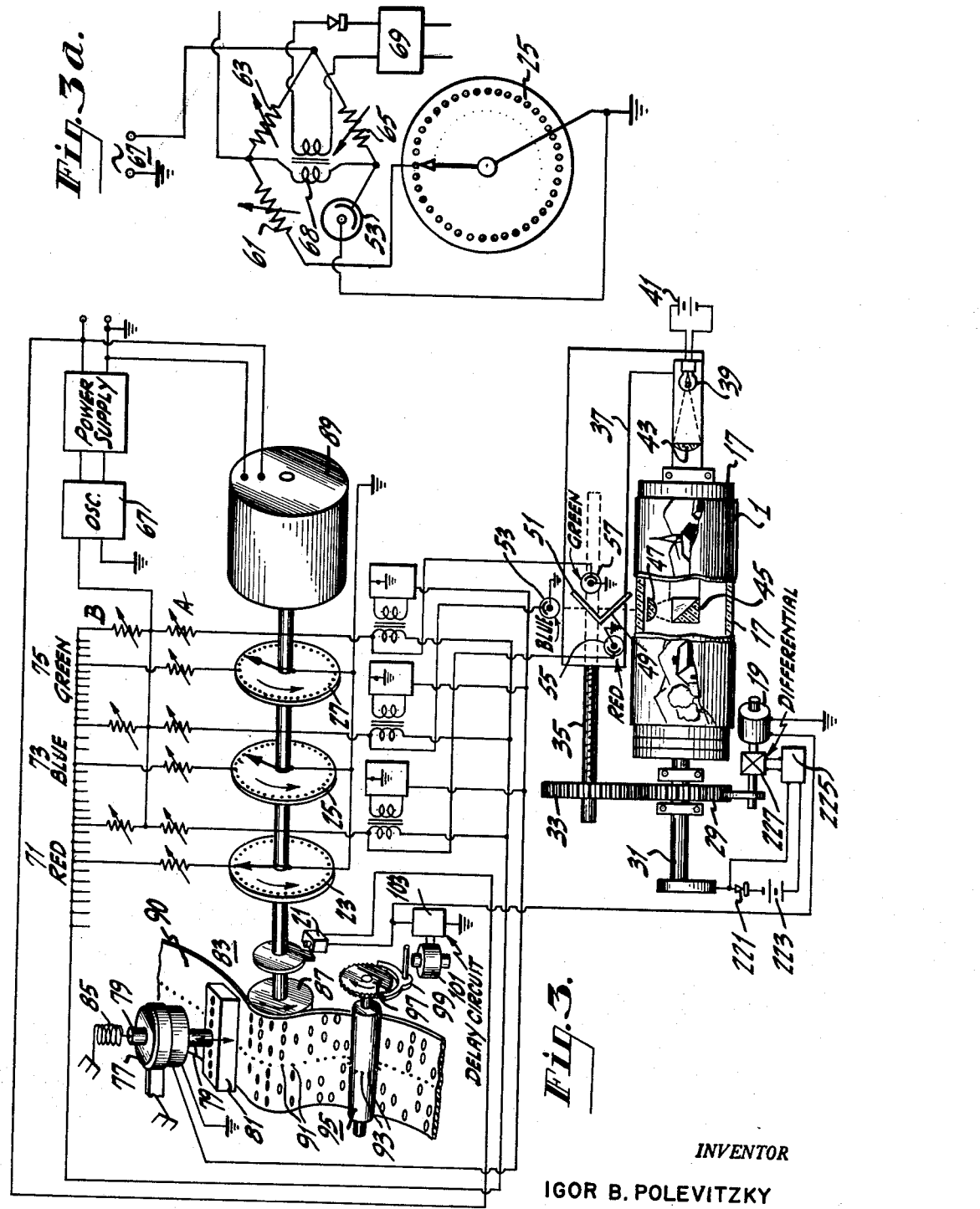

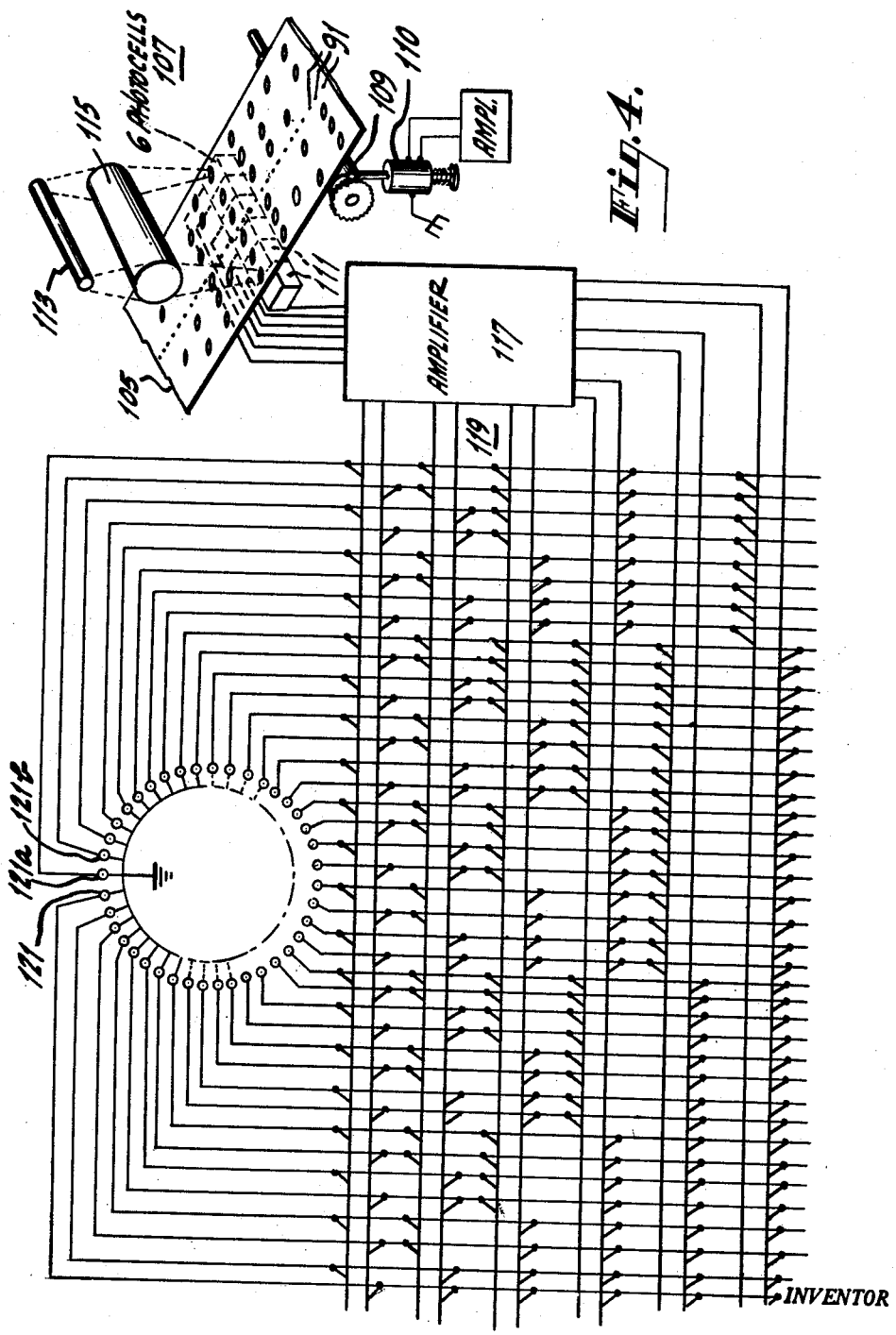

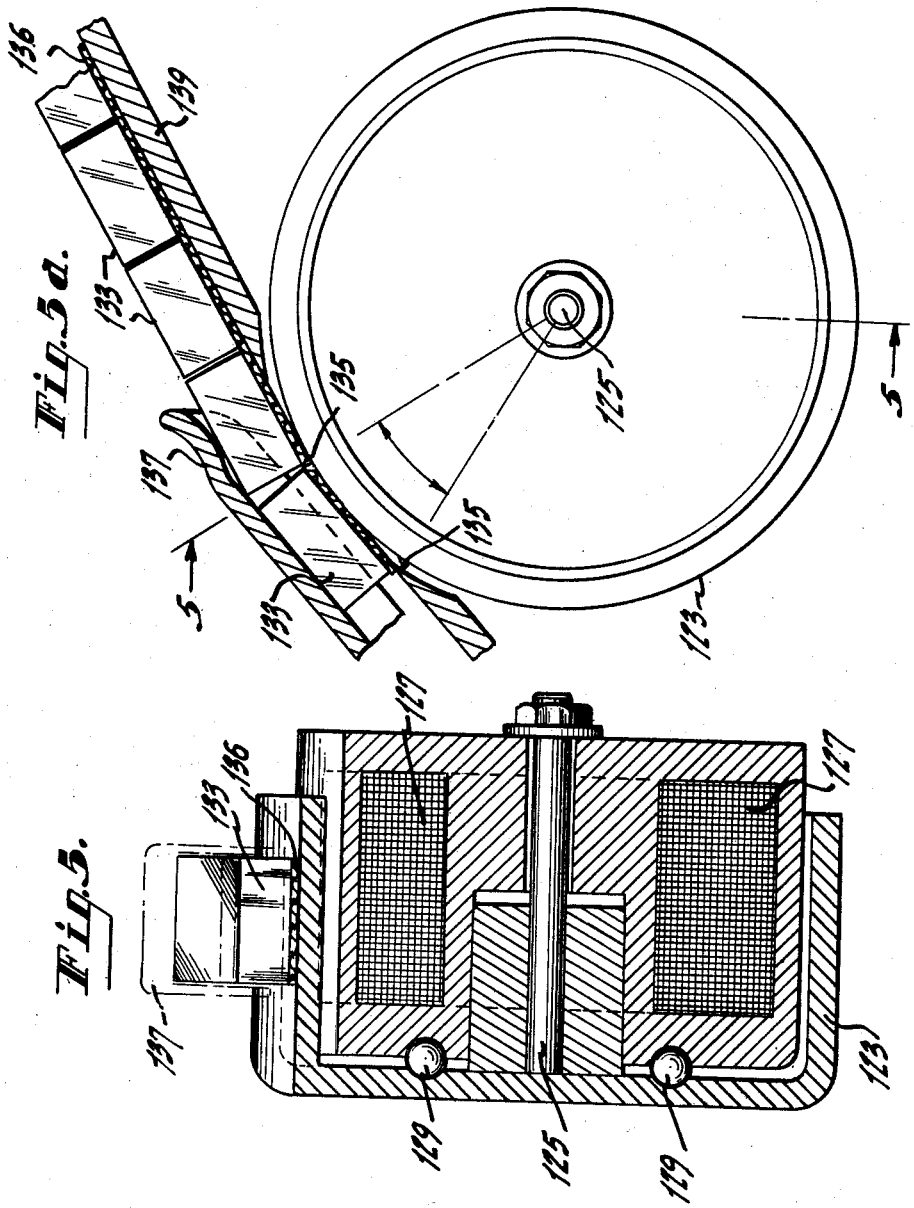

INVENTOR
IGOR B. POLEVITZKY
BY
*CD Tuska*
Attorney

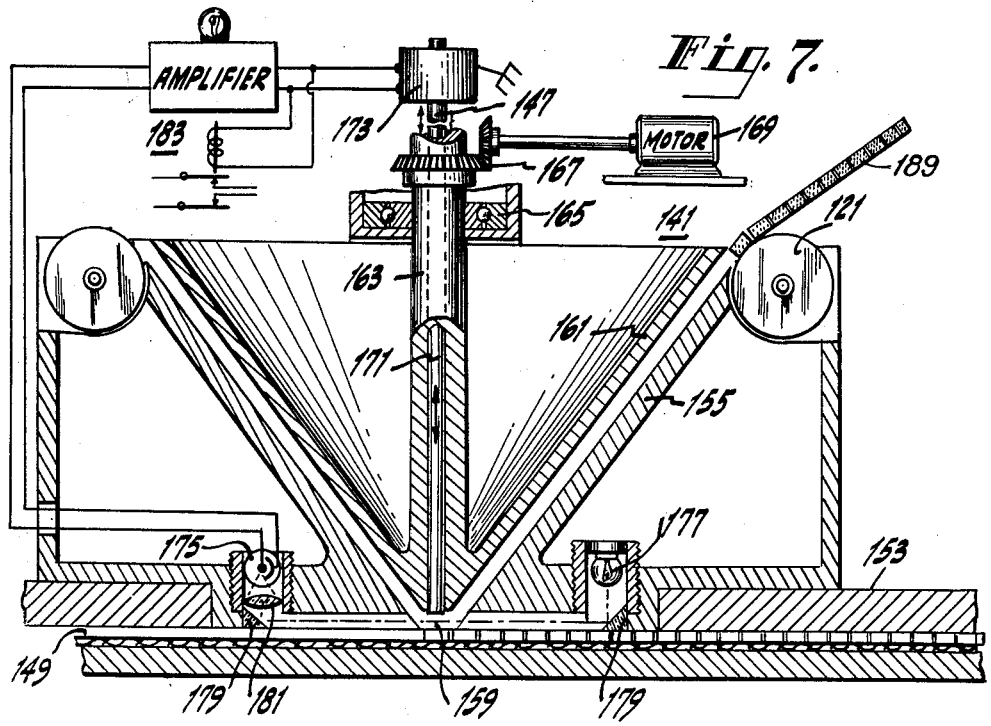
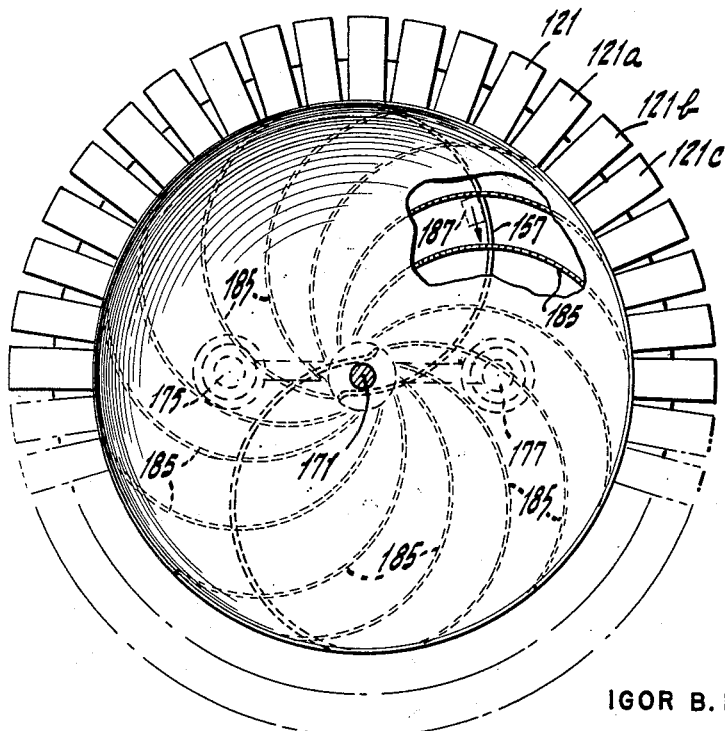

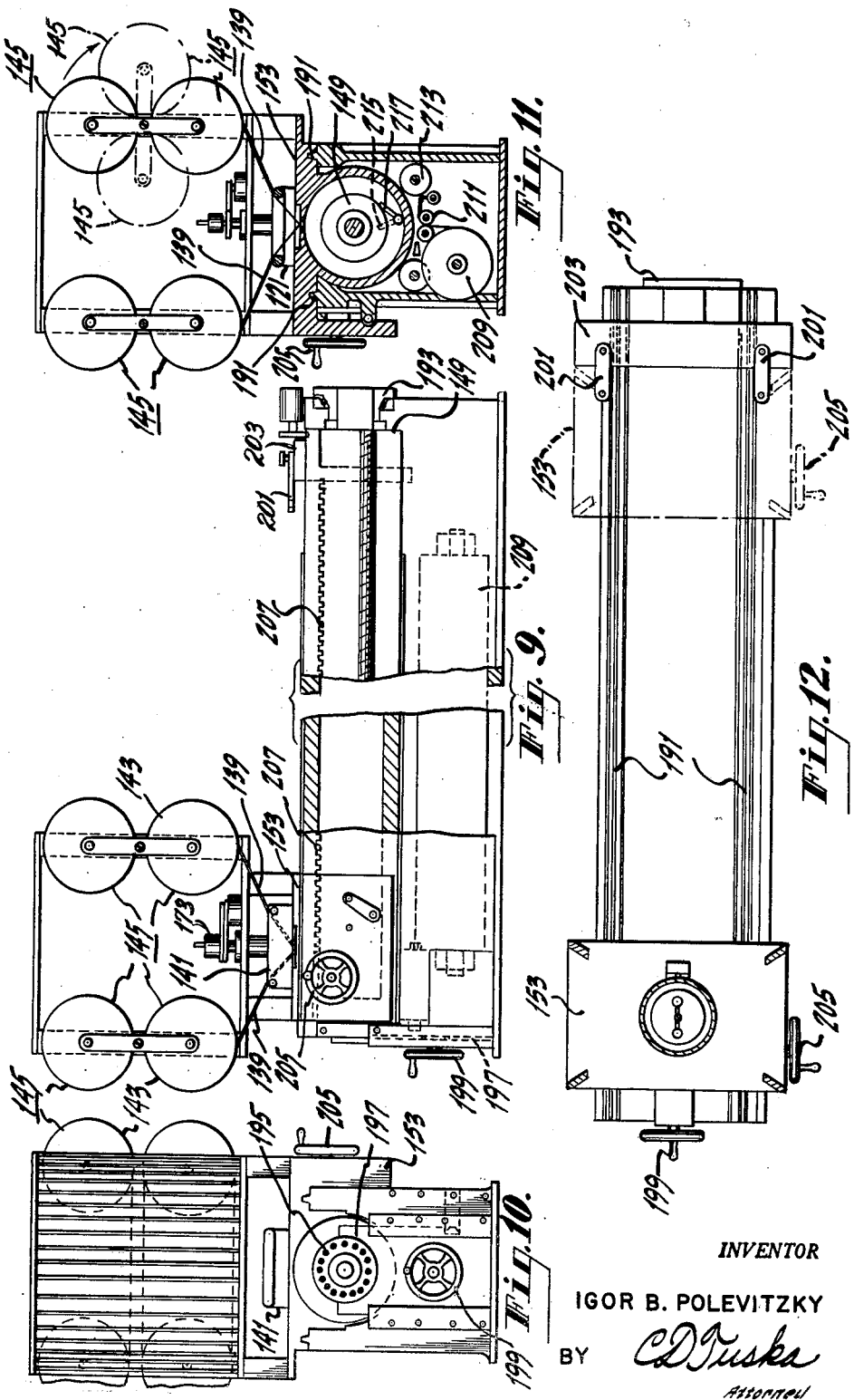

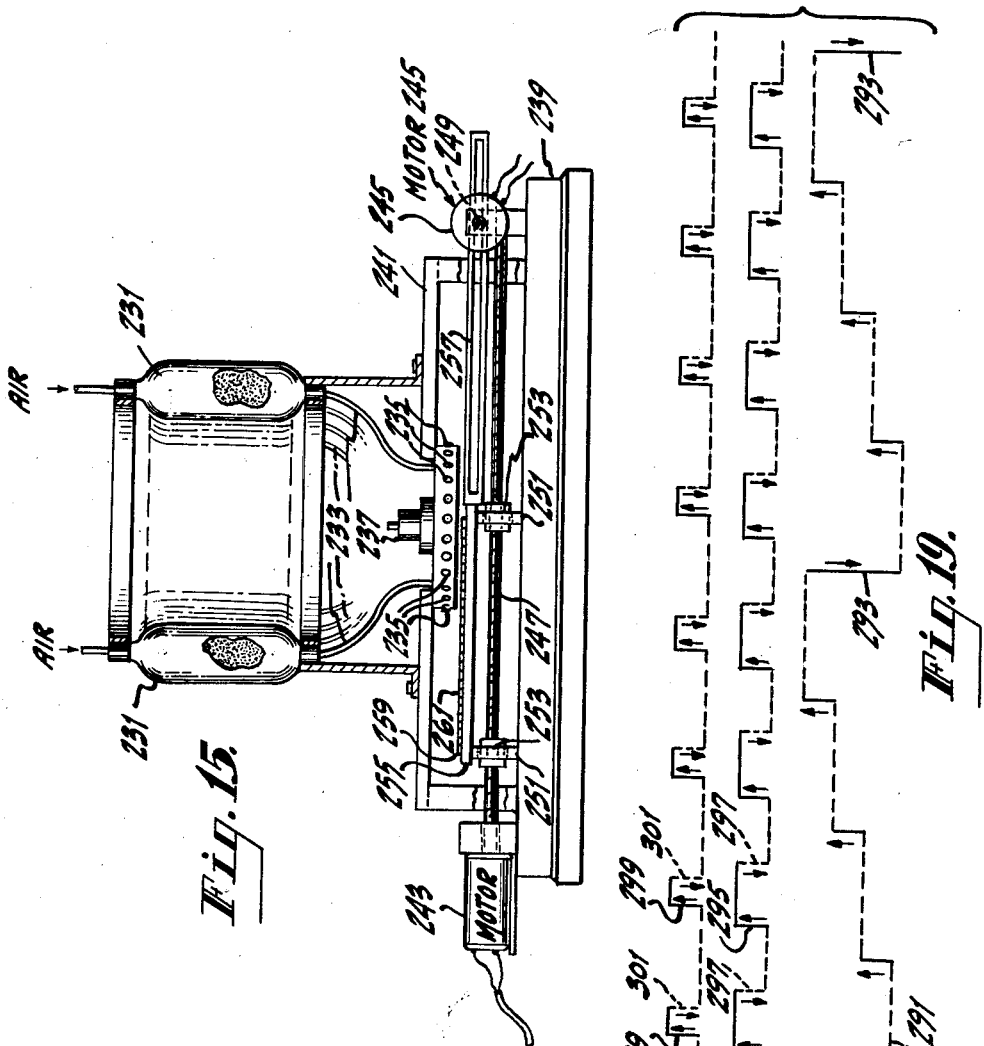

INVENTOR
IGOR B. POLEVITZKY
BY
Attorney

United States Patent Office 3,181,987
Patented May 4, 1965

3,181,987
METHODS AND SYSTEMS FOR REPRODUCING COLOR PATTERNS IN MANUFACTURED ARTICLES, PARTICULARLY MOSAIC TILE
Igor B. Polevitzky, Miami, Fla., assignor to Image Designs, Inc., New York, N.Y., a corporation of New York
Filed May 8, 1961, Ser. No. 108,633
10 Claims. (Cl. 156—299)

This invention relates to methods and systems for reproducing in a manufactured article, such as a tile mosaic, the color and design of a colored picture or other master composition.

In accordance with the invention, the original color picture is scanned area-by-area to determine the proportions of fundamental components of each area. The color analysis of each area is converted to a distinctive one of many different combinations of multi-character binary code which have been assigned for identification of differently colored elements or bits to be utilized in reproduction of the picture. Each of the distinctive combinations of the code derived from the analysis of areas of the color picture is converted to an electrical control pulse distinctive of and effective to release a corresponding color element or bit for assembly in the reproduction of the original colored picture.

More specifically, the invention is concerned with methods and systems for setting mosaic tile of different colors, chroma, and value in accordance with a color composition or picture. The master or original color composition may be either of transparent or reflective type and may be of size different from the final mosaic assembled. The master to be reproduced as a mosaic may, by way of example, be a photographic color transparency. The master is scanned area by area to determine by analysis the color characteristics of each of the elemental juxtapositioned areas which make up the picture. Each area is then automatically identified as a color, with due regard for its chroma and value, in terms of a distinctive number or code. In the example, hereinafter described in detail, forty distinctive colors, including black and white, are chosen, but it should be understood that a larger or smaller number of colors may be employed.

As the color of each area of the master is determined a corresponding code is produced and may be recorded on magnetic, photographic, or perforated tape so that one or more mosaic assemblies may be made from the recorded information. In the example of the invention here described, a six character code is employed in conjunction with the binary system. Such a six character code system may be employed for as many as sixty-four distinctive characters. However, the invention is not limited to any particular code; for example, a five character code associated with the binary system would permit thirty-two distinctive characters or colors.

The coded information is applied either directly or through a tape reader or decoder, to a matrix whose output is in turn applied to forty gates or tile selecting devices. These gates control the tile flow from the tile storage devices, each of which is limited to a distinctive color, via the mosaic tile setter and assembly drum. Furthermore, the gates may be used to control unfired tile material of the desired colors whereby the tiles may be assembled in the required color and pattern arrangement prior to firing and glazing. While the invention will be described as a system for setting one tile at a time in response to a code signal, the system may be used with a plurality of tile selecting gates whereby an entire line or row of tiles may be set. While it is preferable to record the area by area color information so that each part of the system may be operated independently at its optimum rate, or so that a plurality of mosaic tile assemblies may be made from the one record immediately or from time to time, those skilled in the art will realize that the distinctive electrical pulses derived in the point by point analysis of the master may be applied directly to the tile selecting gates or unfired tile material without an intervening code record for setting one or more tiles.

The invention will be described in detail by referring to the accompanying drawings in which:

FIGURE 1 is a schematic drawing of the various method steps or functions of elements of preferred systems of the invention;

FIGURE 2 is a schematic color diagram and chart of the color analysis followed in the practice of the invention;

FIGURE 3 is a perspective view, partly schematic, of the color analyzer and coding device;

FIGURE 3a is a schematic circuit diagram of one of the color matching circuits;

FIGURE 4 is a perspective view of the tape reader, and a circuit diagram of the matrix employed in applying the distinctive signals to the tile selecting gates;

FIGURES 5 and 5a are respectively sectional and side views of one of the tile selecting gates;

FIGURE 7 is a sectional view of the hollow, conical portion of the tile setter;

FIGURE 8 is a plan view of the hollow, conical portion of the tile setter and tile storage devices and the guide strips and brushes which direct the individual tiles to the assembly surface;

FIGURE 9 is a front view of the ways or tracks which carry the tile setter and storage devices over the rotating assembly drum;

FIGURES 10 and 11 are end views of the opposite ends of the device of FIGURE 9;

FIGURE 12 is a plan view of a storage device, like setter, assembly drum, movable carrier, and ways of the invention;

FIGURE 15 is a front view of the device for forming and setting unfired tiles of colors corresponding to a color composition to be reproduced;

FIGURE 19 is a diagrammatic representation of the sequence of the commutators of FIGURE 18.

Figure 6:
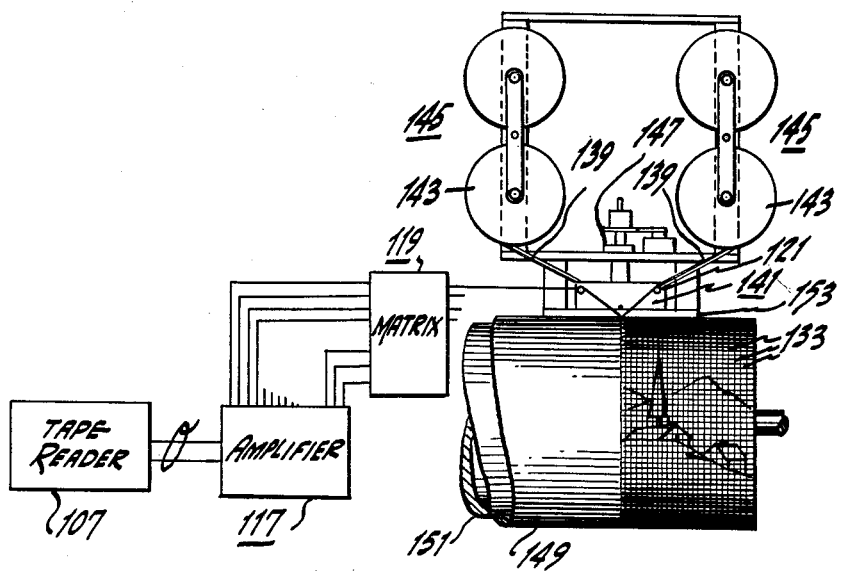
FIGURE 6 is an elevational view of two sets of mosaic tile storage devices, the tile setter, and a portion of the assembly drum.

Referring to FIGURES 1 and 2, a color picture 1 is symmetrically scanned to analyze the color characteristic of each of its elemental areas. The color analysis is based upon the well known color triangle (see FIG. 2a) in which the proportions of the fundamental components—red, blue, and green and their chroma and values—are determinative of a color and its chroma and value. Sufficient color flexibility for an excellent mosaic or bit-by-bit reproduction of a color photograph may be had by dividing the triangle into 18 areas, which are in turn subdivided into one to three parts. The complete division is indicated in the chart (FIG. 2b). It should be understood that the areas are not sharply defined (as shown only for the purpose of illustration in FIG. 2a), but actually blend into each other. For instance, purple of high value is subdivided into two areas, while red of low value is subdivided into three areas. For convenience, each of the 40 sub-areas may be identified according to a number of characteristic code. In the chart, 18 main colors are indicated but the subdivisions of these colors plus black brings the total to forty, which is well within the limitation of a six-character binary type code with its total distinctive combinations of sixty-four. While numbers are used to identify the color characteristics, it should be understood tht the numbers are only abbreviated distinctive labels for the colors derived by analysis of the picture and employed in its reproduction.

The output from the color analyzer 3, for each point or elemental area of the picture 1 is applied to a matching device 5. The output of the matching device operates the tape perforator 7 thereby to impress, upon the tape, code information corresponding to the matched color. The information on perforated tape record 9 is read by a tape reader 11 and then impressed upon the particular tile selecting gate 13 which controls the discharge of a mosaic tile of a color matching the color of the corresponding picture area. The selected tile is then applied by the tile setter 15 to the mosaic assembly surface. As previously explained, the recording functions may be omitted by applying electrical pulses from the color analyzer 3 directly to the tile selecting gates 13. In that event, tape perforator 7, tape record 9, and tape reader 11 may be bypassed or omitted.

*Color analyzer matching device and tape perforator*

The essential details of a suitable color analyzer, matching device, and tape perforator are shown in FIGURE 3. A transparent color picture 1 is wrapped around the transparent hollow scanning cylinder 17. The cylinder is step rotated one scanning area width for each recorded line of code by means of the stepping motor 19. The motor is controlled by the cam operated switch 21 which is closed once per complete revolution of the color analyzing commutators 23, 25, 27. Suitable gearing 29 connects the shaft 31 of the scanning cylinder to the motor. Nevertheless, a stepping motor of a speed appropriately reduced with respect to the speed of the commutators may be used with or without gearing.

An additional gear 33 and a lead screw 35 advance a carriage 37. The carriage is advanced one tile width for each complete revolution of the scanning cylinder for a straight line mosaic. The carriage includes or serves as movable mounting means for the following color analyzing devices: A light 39 (energized from any suitable electric power such as a battery 41), a lens 43, a prism 45, and a second lens 47. All of the immediately foregoing elements move within the hollow scanning cylinder 17. A pair of dichroic mirrors 49, 51 and three photocells 53, 55, 57 are arranged along the light beam from the lens 47. As the cylinder 17 revolves through 360°, preferably as stated in discrete steps, each elemental area of one row of juxtapositioned elemental areas of the picture is in turn subjected to the light beam which is divided by means of the dichroic mirrors into the three fundamental color components, i.e., red, green, and blue, which are also proportioned according to the chroma and value of the color of the elemental area of the picture.

The mirrors 51 are arranged to pass the blue component of the light beam to a photocell 53, the red component to a second photocell 55, and the green component to a third photocell 57. The connections from one of the photocells is shown in the simplified schematic diagram of FIGURE 3A. An electrical bridge consisting of adjustable resistance arms 61, 63, and a resistance 65 and one of the photocells, for example 53, is energized by current from an oscillator or variable frequency source 67. The electrical balance of the bridge circuit is determined between the junction of the resistance arms 61, 63, and the junction of the photocell 53 and resistance arm 65. The balance circuit is connected through a transformer 68 and rectifier to a wave shaping circuit 69 which may include an amplifier.

While a single bridge circuit has been described in connection with FIGURE 3a, the invention requires three bridge circuits 71, 73, 75, respectively for each of the three fundamental color components. In each of the three bridge circuits certain of the elements are connected in parallel, such as the inputs from the oscillator, and two of the resistance elements 61, 63. However, the variable resistance arms 65, and the respective photocells 53, etc., which are used for matching the colors of the picture and the colors of the mosaic tiles are successively connected in their respective bridge circuits by the three commutators 23, 25, 27 which each include as many points as there are preselected colors plus black. The outputs of the three bridges are applied to solenoid 77. The plunger 79 of the solenoid is fastened at its lower end to the female member 81 of the tape perforating die 83. The plunger engages a biasing spring 85 at its upper end.

The tape perforating device 83 includes a male rotor member 87. The rotor includes forty angularly-spaced rows or lines of punches with from zero to as many as six punches per row and arranged in distinctive combinations of spaces and punches to make up forty of the possible sixty-four binary code combinations. The rotor is connected to the same shaft as the commutators 23, 25, 27 which is driven by a stepping motor 89. Thus, the commutators, the tape perforator rotor, and the cam switch 21 are all driven in synchronism. By way of example, the shaft speed may be of the order of three revolutions per second.

The tape 90 preferably includes sprocket holes 91 which are engaged by the sprocket teeth 93 of a tape moving device 95. The tape is advanced once per complete revolution of the commutators by means of a separate stepping motor or as shown by ratchet wheel 97 which is driven by a magnetically operated pawl 99 operated by the electromagnet 101. The magnet may be energized by current from the cam switch 21. The possibility of tape movement at the insatnt of the perforating operation is eliminated by the inclusion of an electrical delay circuit 103. It should be understood that other electrical or mechanical delay means—such as for example, a dashpot, may be employed.

The mode of operation of the color analyzer, matching device, and tape perforator may be described as follows: A beam of light from the source 39 is brought to a focus on an elemental area or spot of the transparent color picture at the start of the scanning operation. The light passing through the area will carry the color characteristics of the spot. The light will be divided three ways by the dichroic elements 49, 51 into components of red, blue, and green. The components, having been applied to the photocells 53, 55, 57 will alter the electrical characteristics of the respective photocells. Since each cell is a portion of the electrical bridge circuits, the balance of each of the three bridges will be determined by the prior adjustment of the bridge. Let us assume that the particular bridges (there are really forty possibilities for each bridge) have been adjusted for equal amounts of red, blue, and green with equal chroma and value, and that in fact, the light beam passes through a red spot of high chroma and value. It follows that the bridge adjusted for this red condition wil be balanced and therefore no output will be obtained. On the other hand, since the other two bridges have been preadjusted for balance respectively for blue and green, these two bridges will be unbalanced for the assumed red condition and hence have outputs. The sum of no output plus two outputs will provide sufficient current to prevent the solenoid 77 of the tape perforator 83 from operating. The commutators 23, 25, 27 will be stepped into contact with one after another of the triplet of bridges until it reaches the triplet in which all of the three bridges were previously adjusted for a specific red light condition. For this angular position of commutators 23, 25, 27 and punch rotor 87, all of the three bridges are in balance for the applied red light and therefore their outputs will be zero. Since there is no current, the plunger 79 of the solenoid 77 will be driven downwardly by the biasing spring 85 and the tape 90 will be perforated in accordance with the combination of code characteristics previously allotted to the specific red under analysis. It should be understood that since red is an important color in an average picture—five variations of red are in fact, available and correspondingly five adjustments are chosen for the triplet of bridges and are accompanied by five lines of distinctively arranged code punches on the rotor 87.

The analysis for color areas is always made through all of the forty color values to find the color value closest to the color of the light passing through each elemental picture area. After the analysis and matching has been completed for one area, the scanning cylinder 17 is automatically stepped to the next or juxtapositioned picture area and the analysis, matching, and tape perforations is repeated. These steps continue until the entire picture has been scanned and recorded.

*Tape record, tape reader, and tile selecting gate*

The tape record, tape reader, and tile selecting gate will now be described in detail by referring to FIGURES 4, 5, and 5a. In FIGURE 4 a portion of tape 105 which has been perforated in accordance with the assigned code is drawn over a tape reader 107 by means of a sprocket type drum 109. The drum is driven by a ratchet device or a stepping motor 110 whereby the tape will stop for an instant, with a code line over a line of six photocells 111 that are positioned in boxes that include apertures of the same size and spacing as the tape maximum of six code perforations. The code line is illuminated by light from a source 113 that is focused by a lens 115 on the code line and through the perforations to the photocells of the reader. Thus, from zero to six perforations in the tape will be illuminated and a corresponding number of photocells will be activated.

The output of the tape reader will be in the form of electrical pulses of the six character binary type. It is necessary to convert the zero to six code character pulses into one of the forty distinctive signals. The conversion may be accomplished by applying the signals (after they have passed through an amplifier 117) simultaneously to the vertical and horizontal connectors of the electrical matrix 119. Since such matrixes are well known in the electronic computer art it is not necessary to provide here a detailed description or an explanation of their mode of operation. Nevertheless, it should be understood that pulses corresponding to the six character code are applied through the connections shown in FIGURE 4. Any one of the forty distinctive signals derived from the matrix are applied to the corresponding one of the forty tile selector gates 121, 121a, 121b, etc. Thus, for a code line read by the reader, an electrical pulse is applied to the gate which corresponds to the predetermined color characteristic. In this manner the gate releases a single mosaic piece of the color corresponding to the color of the analyzed area of the original picture.

The details of the tile selecting gates 121, 121a, 121b, etc., are shown in FIGURES 5 and 5a. A hollow cylindrical armature 123 is provided with a central pole piece 125. The armature is actuated by a solenoid 127 that surrounds the core and is located within the hollow armature. Three or more steel balls 129 are symmetrically arranged in circular races which vary in depth. When the coil 127 of the solenoid is energized, it attracts the armature which in its effort to move longitudinally, is forced to rotate. The rotating force comes from the steel balls moving in their races. The angle of rotation in the relay gate is approximately 25° or slightly more than the width of the mosaic pieces 131, which are carried on the circumference of the armature by the rows of small projecting teeth 135. Each row of teeth is spaced slightly more than the width of a mosaic piece. The mosaic pieces are cemented to a paper tape 136 into which the teeth are forced by the spring member 137. Instead of storing the tiles by applying them to a paper tape as described above, the invention claimed herein may employ magazine type dispensers such as disclosed in United States Patent No. 949,902 which issued on February 22, 1910, to Karazej and Regal.

A guide member 139 steers the paper supported mosaic pieces onto the tile selecting gate. Since the movement of the armature of the gate is both rotational and longitudinal, the motion tears or cuts the first tile from the succeeding tiles and discharges the first tile into the tile setting mechanism hereinafter described. While other types of gates may be employed in the invention, the type described is especially suitable because of its double motion. Moreover, this type of relay is commercially available and only requires the addition of the rows of teeth to produce the tile selection in response to electrical pulses from the matrix or directly from the color analyzer.

*Tile storage, tile setter, and tile assembly*

The tile storage and tile setter portions of one form of system of the invention will be described by referring to FIGURES 6, 7, and 8. Having previously described the tape reader 107, the amplifier 117, and the matrix 119, they are illustrated schematically in FIGURE 6 for convenience. The forty gates 121, 121a, 121b, etc., are arranged around the circumference of a device 141 comprising a pair of hollow conical members 151, 161. Forty guide members 139 (to avoid confusion, only two are shown here) are suitably secured between each gate and the lower magazines 143 of pairs of tile magazine reels 145. The pairs of magazines are rotatably arranged that as soon as a lower magazine is nearly empty, the tape of mosaic tiles of the upper magazine may be secured to the end of the tape of the nearly empty magazine and the upper magazine may be rotated into the lower position. Whereupon, a new tape of the same color tiles may be inserted in the place of the empty magazine without necessarily stopping the assembly operation. Incidentally, if the machine runs out of tiles of the color required, the assembly device will automatically stop in reponse to photocell action hereinafter described.

The hollow, conical device 141 which moves the selected tiles into assembly position includes an axially arranged tile setter 147. The tile setter presses each tile into engagement with a paper 149 whose surface has been previously coated with a soluble cement. The paper has been secured along a narrow, longitudinal strip to a shipping tube 151 which is secured to the tile assembly drum. The hollow, conical members, gates, and tile storage reels are secured to a carriage 153 that is moved along above the assembly drum as each row of the tile has been set. In FIGURE 6 a portion of a scene in mosaic tile corresponding to a part of the original picture (FIG. 3) is shown slightly enlarged. In practice, the enlargement could be much greater; for example, four times or more.

The details and functions of the hollow, conical device 141 (see FIGURES 7 and 8) are as follows: The outer non-rotatable cone 155 is secured to the carriage 153. The inner surface of the cone includes a pair of curved radially extending ribs or projections 157. These projections extend spirally from the circumference of the cone to the discharge aperture at the apex 159 of the cone. At points just before the aperture the ends of the ribs are parallel thereby to orient the tiles into positions parallel to the assembly drum. The inner rotatable cone 161 has a hollow shaft 163 which is journalled in a ball bearing 165. The shaft is driven through bevel gears 167 by a motor 169. This motor 169 may be synchronized with the tape reader to assure an orderly collection of the tiles as they are fed into the space between the cones. A tile setting rod 171 is located within the hollow shaft and is pulsed to move downwardly by a solenoid 173.

The pulsing of the tile setter is determined by the response from a photocell 175. The photocell is activated by light beams from a light source 177 which is focused by a pair of prisms or mirrors 179 and a lens 181 on the photocell. A tile reaching the aperture opening 159 interrupts the light beam. The interruption causes the photocell to react and to set up an electrical pulse. The pulse may be amplified before it is applied to the winding of the solenoid 173. The energized solenoid moves the rod 171 downwardly, and thus the tile is fixed to the assembly surface. The output of the amplifier may include a magnetically operated switch or switches 183 for controlling the machine or for stopping the machine automatically if one of the tile storage devices becomes empty. The switches may also operate warning lights. These details are not shown as they are well known in the electrical art.

The upper cone 161 includes forty brush-like extending ribs 185 that are fixed to, or are a portion of its outer surface. The brush-like ribs may be made of a plastic composition with small projections to avoid scratching or otherwise damaging the tiles. These ribs 185 curve in the opposite direction to the ribs 157 on the fixed cone 155. The oppositely curved ribs extend just far enough from the surfaces of the respective cores to form a guide and cooperating brush. A tile 187 (FIG. 8) having been severed from the tile storage tape 189 (FIG. 7), is moved into the space between the cones where the tile is brushed along one of the curved ribs 157 by one of the brush-like ribs 185. The rotating movement of the brushing rib 185 with respect to the fixed lower rib 157 moves the tile 187 downwardly until the tile is forced into the cone aperture 159. The pair of fixed ribs is arranged to orient each tile with respect to the rows of tiles in the mosaic assembly. While the invention has been described and illustrated with square tiles, it is not limited thereto but may be used with other shapes. Moreover, it should be understood that the tiles may be opaque or transparent. Thus, the final mosaic composition may be of glass tiles thereby to facilitate the manufacture of stained glass windows.

A lathe-like machine illustrated in FIGURES 9, 10, 11, and 12 may be used to operate the assembly drum and associated devices. The machine includes parallel rails 191. The rails engage grooves in the carriage 153. The carriage as previously described, carries the tile storage reels, the assembly cones, and the tile setter. (In FIGURE 11 a pair of reels 145 is shown in dotted lines to represent the position for replacement of a tile magazine.) The assembly drum 149 is mounted at its opposite ends in bearings 193, 195, which are supported upon the bed of the machine. The bearing 195 on the left is mounted within a U-shape member 197 that may be raised or lowered by a rack and pinion operated by a handwheel 199.

In this manner the shipping cylinder and the associated tile-bearing paper cylinder may be removed by lowering the bearing member 197. After the bearing member is lowered, the carriage 153 in its extreme right position may be attached by links 201 to a plate member 203. The plate member 203 includes an aperture which fits slideably over the assembly cylinder 149. The plate member, which then engages the end of the shipping cylinder, may be moved to the left by power or by a handwheel 205 that is connected through rack and pinion means 207 to the carriage 153.

While the shipping cylinder may be made separately and slipped over the assembly cylinder, there are advantages in forming the shipping cylinder on the assembly drum as follows: A roll of kraft paper 209 is suspended under the assembly cylinder. The kraft paper is carried over guide and pressure rollers 211, 213, to the cylinder 149 where the paper is inserted into a slot 215. The slot includes a cam operated locking bar that is moved by a lever 217. Thus, the paper is secured and is locked in its starting position. As the assembly cylinder is rotated, all color analyzing, coding, decoding, and tile setting operations being suspended, the paper is coated with glue on the surface, removed from the assembly cylinder. The glue coated paper is wrapped layer upon layer until a strong shipping cylinder is formed. The kraft paper is then cut with a knife blade which may be associated with the cylinder forming mechanism. The resulting cylinder is thus securely locked to the assembly drum and free from the faults or lack of proper fit that might accompany an independently made cardboard shipping cylinder.

The tile assembly paper requires different handling so that the assembled mosaic may be separated from the shipping cylinder and may be readily flattened for use on the site where the mosaic is to be placed. The start of the assembly paper is cemented along a longitudinal strip about two inches wide in the case of a mosaic of the order of four feet by eight feet size. The end of the assembly paper is made to overlap its start by about two inches, which two-inch strip is also cemented securely to the start of the assembly paper. It should be understood that no tiles are applied to this longitudinal strip where the assembly paper is secured.

The assembly paper must be coated or spotted with a soluble glue so that the paper may be removed from the tile when the mosaic is finally set. Moreover, the soluble glue is best applied in each of the spots where the separate tiles are to be set. Since the assembly of one quarter inch tiles in 384 rows of 192 tiles to each row would consume several hours, it is best to coat the areas only shortly before the individual tiles are to be set. This depends upon the hardening or drying rate of the glue and upon the possible application of forced drying. The application of the tile adhesives is well known in the tile industry and therefore no detailed description is required here.

If soluble glue and paper are to be applied, the usual practice is to apply the paper to the surface of the tile which is to be exposed after the paper is removed. On the other hand, if a permanent backing material of the lattice or perforated type is to be employed, the backing material is applied to the tile surface which is to be bonded to a wall or floor. One such backing material and the adhesives therefore is described in United States Letters Patent 2,887,867, which was issued on May 26, 1959, to Burchenal and Balinkin. It should be understood that any type of tile assembly sheet or material may be used with or without the paper shipping cylinder herein described.

Figure 13:
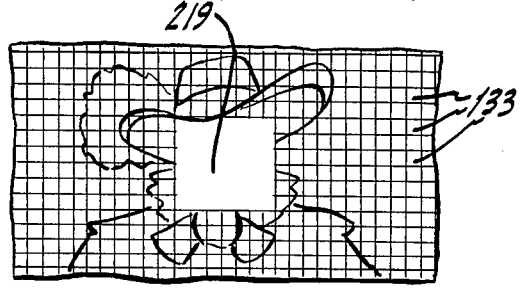
FIGURE 13 is a mosaic assembly with a portion omitted whereby smaller tiles may be used to complete the composition in greater detail.

While tiles of ¼" x ¼" will ordinarily provide an uninterrupted picture with sufficient detail when viewed at the proper viewing angle, there are occasions when finer structure may be desired. The system of the invention may be easily modified to omit a portion of the composition. In FIGURE 13, the face 219 of the mosaic figure has been omitted. The space may be filled by hand or by adopting elements of the system of the invention to tiles of a smaller size. The smaller size mosaic composition may be assembled independently of the main composition and inserted after the completion of the mosaic assembly with the reserved space.

Figure 14:
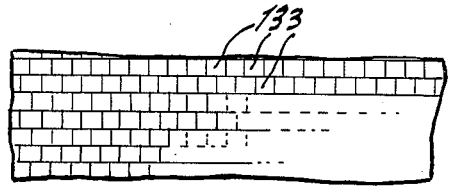
FIGURE 14 represents a mosaic in which alternate rows of tile are off-set.

There are also situations in which interlocking or offset rows of tiles are required as illustrated in FIGURE 14. This may be accomplished automatically according to the invention as shown in FIGURE 3. A cam switch 221 operated by the shaft is connected through power source 223 to a solenoid 225. The solenoid operates through differential gearing 227 to advance (or retard) every other scanning line by a distance equal to substantially one-half of a discrete picture area. Through similar connections (not shown) the assembly cylinder is advanced (or retarded) one-half of a tile width for alternate rows of tile. In this manner, alternate rows of tiles are off-set or interlaced. Finally, a switch operated by the assembly drum may be used to de-energize the tile setter or scanning device to interrupt scanning and tile setting operations as the assembly drum moves through the two-inch tile-free longitudinal strip which preferably extends on either side of the paper-locking slot 215 (FIG. 11).

In FIGURE 15, the system of the invention is applied to a mechanism for forming color tile material in a color composition or color mosaic product, corresponding to a color picture, prior to firing or glazing the tile. Clay or other suitable material of the required color characteristics is stored in forty containers 231 of which only two are shown. Compressed air or a hydraulic fluid is applied to the containers to force the tile material through tubes 233 into injectors 235 that will be described hereinafter by reference to FIGURES 16 and 17. A tile former and setter 237 is disposed at the center of the injectors. The containers, injectors, and setter are supported above a base 239 by a stand 241.

A pair of stepping motors 243, 245, are mounted on the base 239. Each motor shaft is connected to a corresponding one of the lead screws 247, 249. The lead screw 247 extends through a pair of vertical members or runners 251 that are provided with female threaded members 253 which engage the lead screw 247. The threaded members 253 are slideably mounted in slots of runners 251 whereby a carriage 255 mounted on the vertical members or runners may be driven step by step from left to right and vice versa by motor 243 and, as subsequently described, at right angles thereto, by motor 245. The bottoms of the vertical members are machined smooth whereby they slide freely along the base 239 when driven by the motor and lead screw arrangement. The sliding friction of the vertical members may be reduced by ball bearings, not shown.

The carriage 255 includes a pair of extended arms 257 which like the vertical members 251 are slotted. The lead screw 249 of the stepping motor 245, to the right of the drawings, engages a female threaded member similar to members 253, that is slidably positioned within the slots. The action of the right-hand motor 245 through its lead screw is to drive the carriage step by step, in a direction perpendicular to the plane of the paper. Thus, the carriage may be moved step by step and row by row by the motor driven lead screws 247, 249 to cover the entire area on which the mosaic composition of unfired tile is to be formed.

A detachable plate 259 is mounted on the table by clamping means not shown. The detachable plate includes shallow depressions 261 into which the tile material is forced by the tile setter member 237. The contour of the depressions is determined by the desired shape of the tile.

The dimensions of the depressions are made larger than the finished sizes of the tile pieces to allow for shrinkage in the firing. The walls of the depressions are preferably tapered slightly to ease the subsequent detachment of the tile. The firing and glazing of the tile is in accordance with the established practice of the art and quite independent of the machine and assembly of the invention.

The details of the injectors and tile former or setter will be described by reference to FIGURES 16 and 17. The tile material injectors 235 may be radially disposed within a plate member 263. Each injector includes a solenoid comprising a coil 265 and an armature 267. The armatures are respectively secured to spoon-like members 269. The rounded end of the spoon members include an aperture 271 of a contour similar to the contour of the finished tile and of dimensions slightly smaller than the depressions 261 in the detachable plate 259.

It should be understood that the plate member 263 includes openings for the solenoids and slideable channels for each of the spoon members. In addition the tubes 233 from the material containers 231 are secured by conventional fittings 270 to a series of channels 273 which respectively terminate in the spoon channels at points immediately above the respective apertures 271 when the spoon members are retracted by the biasing springs 275. The biasing springs are immediately effective to retract the spoon members when the solenoid windings 265 are disconnected from their power supply (see FIGURE 18).

The centrally located tile former and setter 237 is also operated by a solenoid and biasing spring arrangement. The armature 277 is biased in an upward position by the spring 279. The lower portion of the armature is connected to a tile forming and setting plunger 281 which moves within a guide channel in the plate 263. The plunger, being of the same shape as the spoon-aperture 271 and a sliding fit therein, passes through the aperture when the armature 277 is attracted downwardly by its solenoid. When the power is removed from the solenoid, the armature and plunger 281 are moved upwardly by the spring 279. On the downward move the plunger presses the tile material through the aperture 271 in the selectively-actuated spoon 269 and into the underlying depression 261 in which the unfired tile is formed.

Figure 17:
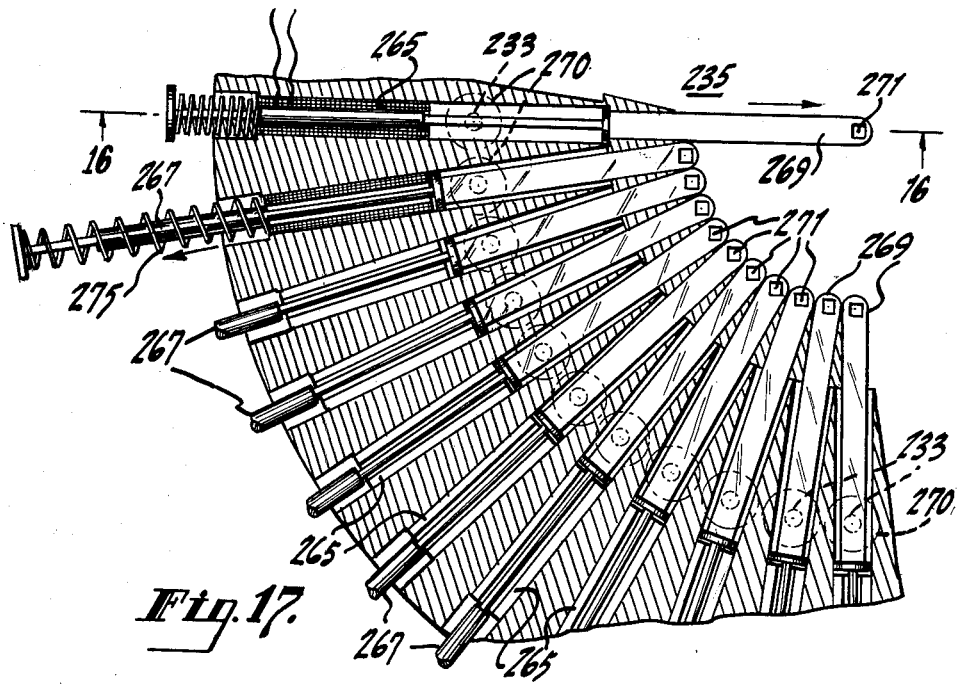
FIGURE 17 is a partial plan view of the FIGURE 16.
Figure 18:
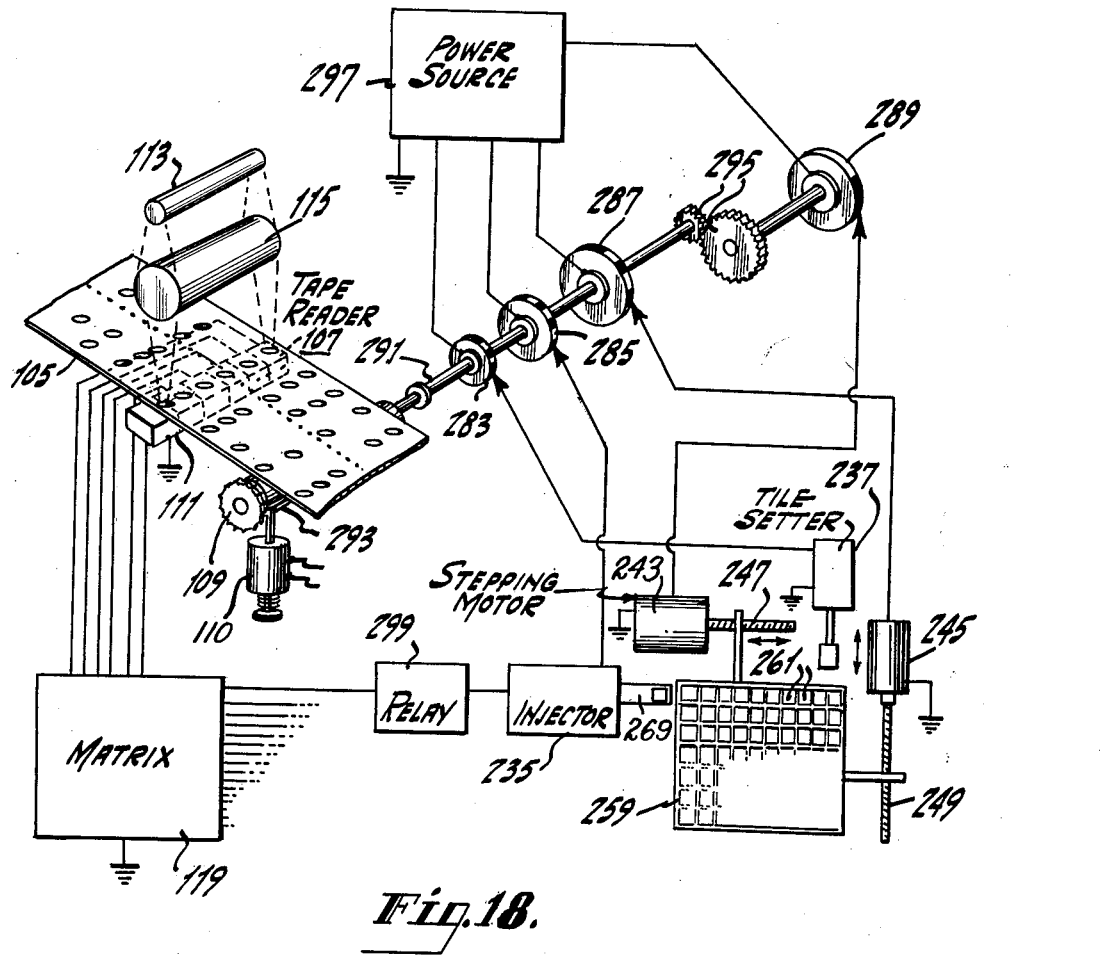
FIGURE 18 is a schematic diagram of the electrical connections of the device for forming and setting unfired tile.

The sequence of operation will be described by referring to FIGURES 18 and 19. The color comparison and the color coding for each tile have been described previously. The operation of the perforated tape, the tape reader, and the matrix have also been described. These operations are unaltered for the operation of the setting of tile material as distinguished from setting finished tiles. The point of departure is the connection of four commutators 283, 285, 287, 289, to the shaft 291 of the tape advance sprocket 293. The fourth commutator 289 is connected to the shaft 291 by reduction gearing 295. The function of the commutators is (1) to connect the power supply 297 to the motors 243, 245; and (2) to the solenoids 235, 237 in the proper time sequence. Thus, when the carriage is stationary, relays 299 in the output circuit of the matrix energize the proper injector as determined by the color code signal. The spoon of the selected injector has picked up a batch of the tile material of the desired color and is driven forward as shown in FIGURES 16 and 17. A stop on the spoon member brings it to rest so that its aperture 271 with its batch of tile material is located immediately under the plunger of tile setter 237.

Figure 16:
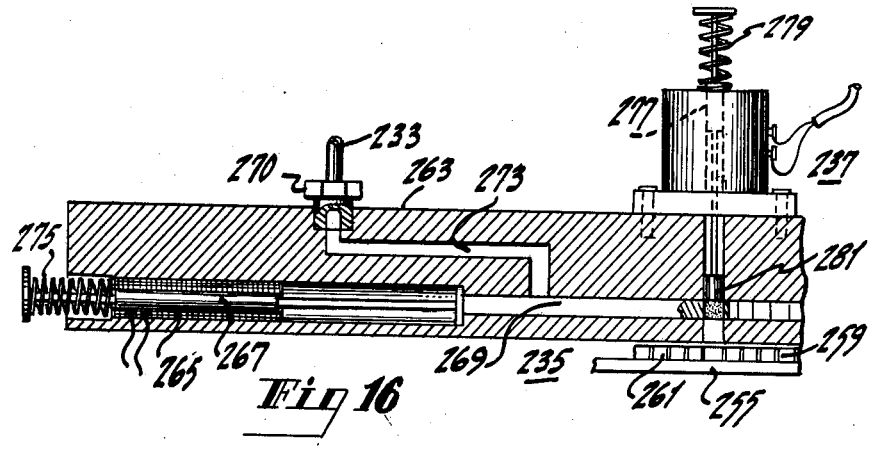
FIGURE 16 is a section view taken on a line 16—16 of FIGURE 17.

When the spoon has come to rest, the solenoid of the tile setter 237 is energized (see FIGURE 16). The tile material is pressed by the plunger 281 which pushes the material through the aperture and into the appropriate depression 261 on the detachable plate 259. The power applied to the solenoid is disconnected by the commutator 283 whereupon the biasing spring 279 returns the plunger 281 to its upper position. Next, the commutator 285 disconnects the injector 235 from the power supply and the biasing spring 275 returns the spoon member to be reloaded with tile material. The commutator 287 has also disconnected the power supply from the stepping motor 243 thereby to be ready to step the carriage to the next tile position. In the illustration of FIGURE 16 only a few tiles are shown as a row; nevertheless, any reasonable number up to say several hundred may be used in each row. After a row of tile materials has been set in accordance with the tape signals or directly from the color comparator, the slower moving commutator 289 applies power to the second stepping motor 245 whereby the carriage may be returned to the beginning of the next row. One skilled in the art will realize that the second row may be set in the reverse order, mutatis mutandis. In that event, the original scanning should be altered to record the color code in the desired order, or every other row of code lines may be reversed. Reversing the tile setting order in every other row may be used to shorten the time cycle of the machine.

In the diagrammatic representation of FIGURE 19 the carriage or table motions under the influence of the commutator, are indicated by the solid lines and the arrows. The broken lines 291 indicate no motion of the table and the disconnection of the power supply. The long solid line 293 and reverse arrow indicates the return of the table to its starting position after the laying of 4 batches of the tile material. It will be noted that the injector operates only when the table is at rest. The solid line 295 of the injector indicates that its solenoid is energized, the spoon member is moved to its unloading position; and the broken line 297 indicates that the biasing spring restores the spoon member to its loading position.

The solid line 299 of the setter indicates the application of power to its solenoid, the movement of the plunger to set the tile; and the broken line 301 indicates that the biasing spring restores the tile setter to its ready position. These steps are followed by a movement of the table to the next position. Since the four commutators are secured to the same shaft (one through gearing) the timing remains synchronized, and interference between steps is avoided and the foregoing sequence is realized. While biasing springs are shown equivalent results may be obtained by using two solenoids that may be energized in the proper order to move the spoon or to operate the setter. Similar movement may be obtained by substituting hydraulic devices for the solenoids.

The invention is claimed as follows:

1. The process of producing a mosaic composition corresponding to an original color picture which includes the steps of analyzing said color picture by scanning the picture area by area concurrently to determine the color, chroma, and value of each of said areas as fixed by the proportions of its fundamental color components, deriving from the analysis of each of said areas a binary-coded signal representative of the color, chroma and value of that area, storing a plurality of moasaic tiles in groups having colors substantially matching the colors in said picture, sequentially releasing from said plurality of mosaic tiles a plurality of tiles with each tile having a solar chroma and value corresponding to the color analysis of the corresponding color picture area, and assembling said tiles in the order of said scanning whereby the mosaic composition corresponds to the original color picture.

2. The process of automatically reproducing a color picture as a mosaic which includes scanning said color picture area by area, ascertaining the color characteristics of each of said areas in the same sequence as said scanning and as fixed by the proportions of three fundamental color components, recording the color characteristics of each of said areas in accordance with a distinctive one of the total number of combinations afforded by a multi-character binary code, storing a plurality of mosaic tiles in groups of different colors respectively corresponding with distinctive combinations of said binary code and the areas of said color picture, decoding the recorded binary-coded combinations to produce electrical pulses distinctive thereof, releasing said stored tiles one by one in response to said electrical pulses and in an arrangement corresponding to the areas scanned, and assemblying said tiles in a mosaic composition corresponding in area by area pattern and color to said color picture.

3. A process of producing a mosaic composition corresponding to a color picture which includes the steps of analyzing said color picture by scanning said picture area by area to determine the color characteristics of each area as fixed by the proportions of three fundamental color components, deriving from said analysis binary-coded electrical pulses corresponding to the distinctive color of each said area, storing a plurality of tiles in groups corresponding respectively to said distinctive colors, releasing from said groups in response to said electrical pulses tiles of the same color characteristics as said area color characteristics, assemblying said tiles in an arrangement corresponding to said color picture in area by area positions and colors, and off-setting alternate rows by an amount substantially the same as half the width of one of said areas.

4. A process of producing a mosaic composition corresponding to a color picture which includes the steps of analyzing said color picture in juxtapositioned rows of discrete and substantially equal areas to determine the proportions of three fundamental color components of each of said areas, off-setting the scanning of alternate rows by an amount substantially equivalent to one-half the width of one of said discrete areas, recording the analyzed color of each discrete area as a distinctive one of the total number of combinations of a multi-character binary code, storing a plurality of color tiles in color groups corresponding to the analyzed colors of said areas as represented respectively by a distinctive combination of said code, decoding the binary-coded combinations to produce electrical pulses distinctive thereof, for each pulse releasing one of said tiles by applying forces derived from said electrical pulse and corresponding to the color represented by said distinctive code combination, and assemblying said tiles in alternately off-set rows corresponding pattern and color to said juxtapositioned rows.

5. A system for reproducing in a mosaic article the color and design of a master which comprises a plurality of storage devices, each storing mosaic elements of like color and differing from the color of elements stored in the other of said devices, an assembly mechanism for applying elements received from said storage devices each to form an elemental area of said article, and control means controlling the selective supply to said assembly mechanism of elements from different storage devices comprising means for converting light from each elemental area of said master into electrical signals respectively representative of the fundamental color components thereof, and means responsive to the concurrent values of said signals for each elemental area of said master for determining from which of said storage devices an element is supplied to said assembly mechanism to form a corresponding elemental area of said mosaic article.

6. A system as in claim 5 in which the assembly mechanism includes a tile setter repeatedly actuated successively to press successively selected prefired mosaic elements onto an assembly drum, and supporting means for said asembly drum angularly stepped to present successive elemental areas thereof to said setter whereby said mosaic article is progressively produced with each applied element thereof similar in color to a corresponding elemental area of the master.

7. A system as in claim 5 in which the assembly mechanism includes a tile former and setter repeatedly actuated successively to press successively selected unfired mosiaic elements into depressions of an assembly plate, and means for stepping said assembly plate to present successive depressions thereof to said tile former and setter whereby the unfired mosaic article is progressively produced with each applied element thereof similar in color to a corresponding elemental area of the master.

8. A system as in claim 5 in which said control means includes means for storing the concurrent values of the fundamental color component signals for each elemental area of the master in a code whose code groups respectively correspond with the colors of the mosaic elements respectively stored in said storage devices.

9. A system as in claim 6 in which the light-converting means scans juxtapositioned rows of elemental areas of said master, and which additionally includes means for varying the start of alternate rows substantially half of the width of one of said master areas, and which additionally includes means for rotating said drum through an angle substantially equal to one-half the width of one of said mosaic elements for every other revolution of the drum.

10. A method of reproducing in a manufactured article the color and design of a color composition such as a picture which comprises storing colored elements in groups of like color, the elements of different groups being of different color with each color having assigned thereto distinctive combinations of a multi-character binary code, scanning said color composition area-by-area by a light beam, deriving from the light from each area three signals respectively representative of the proportion of the fundamental components of the color of that area, encoding the concurrent values of the signals for each area as a distinctive one of the combinations of said binary code, selecting elements from said different groups thereof each in accordance with that distinctive combination of said binary code which has been encoded from the concurrent values of the fundamental color-component signals of each area of said color composition, and assembling the selected elements in position to form a manufactured article reproductive of said color composition as to design and color.

References Cited by the Examiner

UNITED STATES PATENTS

| | | |
|---|---|---|
| 1,817,098 | 8/31 | Ranger. |
| 1,952,204 | 3/34 | Gary et al. 178—6.6 |
| 2,335,864 | 12/43 | Lang. |
| 2,709,864 | 6/55 | Gulbrandsen 41—23 XR |

FOREIGN PATENTS 26,647   11/06   Great Britain.

EARL M. BERGERT, *Primary Examiner.*

JACOB STEINBERG, CARL F. KRAFFT, *Examiners.*